US012692404B1

(12) United States Patent
Constantinou

(10) Patent No.: US 12,692,404 B1
(45) Date of Patent: Jul. 28, 2026

(54) STABILIZING ADDITIVE FOR PIGMENTED INKJET INKS AND METHODS OF USE

(71) Applicant: Andrew Constantinou, Altadena, CA (US)

(72) Inventor: Andrew Constantinou, Altadena, CA (US)

( * ) Notice: Subject to any disclaimer, the term of this patent is extended or adjusted under 35 U.S.C. 154(b) by 0 days.

(21) Appl. No.: 19/303,371

(22) Filed: Aug. 19, 2025

Related U.S. Application Data

(60) Provisional application No. 63/769,750, filed on Mar. 11, 2025.

(51) Int. Cl.

| | |
|---|---|
| *C09D 11/38* | (2014.01) |
| *B41J 2/16* | (2006.01) |
| *B41J 2/165* | (2006.01) |
| *B41J 2/21* | (2006.01) |
| *C09D 11/033* | (2014.01) |
| *C09D 11/037* | (2014.01) |
| *C09D 11/322* | (2014.01) |
| *D06P 1/48* | (2006.01) |
| *D06P 1/60* | (2006.01) |
| *D06P 1/62* | (2006.01) |
| *D06P 1/673* | (2006.01) |
| *D06P 5/30* | (2006.01) |

(52) U.S. Cl.
CPC ............. *C09D 11/38* (2013.01); *B41J 2/1606* (2013.01); *B41J 2/16502* (2024.05); *B41J 2/2103* (2013.01); *C09D 11/033* (2013.01); *C09D 11/037* (2013.01); *C09D 11/322* (2013.01); *D06P 1/48* (2013.01); *D06P 1/60* (2013.01); *D06P 1/627* (2013.01); *D06P 1/67366* (2013.01); *D06P 5/30* (2013.01)

(58) Field of Classification Search
CPC ..... C09D 11/38; C09D 11/033; C09D 11/037; C09D 11/322; B41J 2/1606; B41J 2/16502; B41J 2/2103; D06P 1/48; D06P 1/60; D06P 1/627; D06P 1/67366; D06P 5/30
See application file for complete search history.

(56) References Cited

U.S. PATENT DOCUMENTS

2023/0332002 A1* 10/2023 Sambhy ............... C09D 11/037

FOREIGN PATENT DOCUMENTS

JP 2024127364 A * 9/2024 ........... C09D 11/322

OTHER PUBLICATIONS

English machine translation of JP-2024127364-A (Year: 2024).*

* cited by examiner

*Primary Examiner* — Amber R Orlando
*Assistant Examiner* — Jeffrey Eugene Barzach
(74) *Attorney, Agent, or Firm* — John Alumit

(57) ABSTRACT

A non-hazardous, non-flammable suspension stabilizer solution for pigment-based textile inks, the solution comprising between 75 and 95 percent propylene glycol, 1-5 percent glycerine, 1-5 percent polyethylene glycol, 1-3 percent ethylene glycol, 1-3 percent dipropylene glycol, between one and two percent butylene glycol, 0.1-1 percent sodium dodecyl sulfate, 0.1-1 percent xanthan gum, 0.1-1 percent ethylenediaminetetraacetic acid, 0.05 to 1 percent trisodium phosphate, and between one and five percent deionized water. The solution is mixed with an ink in the ratio of two percent to twenty percent by volume. The solution also contributes to longer shelf-life, antimicrobial protection, and reduced drying at printhead nozzles.

4 Claims, No Drawings

STABILIZING ADDITIVE FOR PIGMENTED INKJET INKS AND METHODS OF USE

CROSS REFERENCE TO RELATED APPLICATIONS

This application claims the benefit of the priority filing date of U.S. provisional application No. 63/769,750, entitled 'Liquid Additive for Reducing Ink Clogging and Enhancing Color Properties' and filed on Mar. 11, 2025, the contents of which are incorporated by reference in their entirety.

FIELD OF THE INVENTION

The present invention relates to liquid additive compositions used in digital printing, including but not limited to textile, packaging, label, wide-format, and inkjet-based imaging systems. The invention is particularly applicable to pigment-based inks-such as those used in direct-to-film (DTF) and direct-to-garment (DTG) printing-including both white inks containing titanium dioxide and colored inks using pigments like Pigment Blue (cyan), Pigment Red (magenta), Pigment Yellow (yellow), and Pigment Black or carbon black (black). Specifically, the invention provides a non-hazardous, non-flammable suspension solution designed to enhance pigment stability, improve ink flow, prevent printhead clogging, reduce pigment settling, and increase overall color vibrancy and reliability across a range of ink formulations.

BACKGROUND

Pigmented inks-including white ink containing titanium dioxide (TiO$_2$) and color inks such as cyan, magenta, yellow, and black-rely on solid particulate pigments for color density and opacity. These pigments include titanium dioxide for white, Pigment Blue for cyan, Pigment Red for magenta, Pigment Yellow for yellow, and Pigment Black or carbon black for black ink. Due to their relatively high density compared to the liquid carriers in ink formulations, these pigments have a natural tendency to settle over time. This sedimentation can lead to clogged printheads, inconsistent ink flow, image defects, and increased wear on digital printing equipment, often necessitating frequent maintenance and reducing overall printing efficiency.

Industry solutions currently in the art include continuous agitation and circulation systems. These are not always effective in preventing clogging over the course of time under extended use. Additives have been developed to act as dispersants, reducing inter-particle interactions and improving ink stability. These additives frequently contain flammable or hazardous components, however, making them unsuitable for transportation, in contexts such as air shipping, or in international cargo transport.

For these reasons it is an object of the present invention to solve these issues by providing a stable, non-hazardous, and non-flammable formulation that effectively suspends pigments (such as titanium dioxide), lubricates printheads, and enhances ink performance without requiring hardware modifications. These and other objects of the invention are more fully described in the following specification and disclosures.

SUMMARY

A solution and method of use is disclosed for improving ink, reducing ink clogging, and enhancing color properties.

The solution may further exhibit antimicrobial properties, extended shelf-life, and reduced nozzle drying, which collectively enhance reliability and usability in commercial inkjet systems. The solution is a non-hazardous and non-flammable suspension stabilizer solution for pigment-based textile inks. The solution, by volume, includes between 75 and 95 percent propylene glycol, one to five percent glycerine, one to five percent polyethylene glycol, one to three percent ethylene glycol, one to three percent dipropylene glycol, between one and two percent butylene glycol, 0.1-to one percent sodium dodecyl sulfate, 0.1-to one percent xanthan gum, 0.1 to one percent ethylenediaminetetraacetic acid, 0.05 to one percent trisodium phosphate, and between one and five percent deionized water.

In preferred implementations, the polyethylene glycol molecular weight is between 400 and 600 (i.e., from polyethylene glycol 400 to polyethylene glycol 600). Beyond this preferred range, a total range of between 200 and 1000 (i.e., polyethylene glycol 200 to polyethylene glycol 1000) may be used in the formulation.

Also cover possibilities of using any polyethylene glycol between 200-1000 molecular weight.

The method of using the solution includes the steps of providing propylene glycol such that it comprises between 85 and 95 percent of the solution, providing glycerine such that it comprises two percent of the solution, providing polyethylene glycol such that it comprises two percent of the solution, providing ethylene glycol such that it comprises one percent of the solution, providing dipropylene glycol such that it comprises one percent of the solution, providing butylene glycol such that it comprises between one and two percent of the solution, providing sodium dodecyl sulfate such that it comprises 0.2 percent of the solution, providing xanthan gum such that it comprises 0.3 percent of the solution, providing ethylenediaminetetraacetic acid such that it comprises 0.1 percent of the solution, providing trisodium phosphate such that it comprises 0.05 percent of the solution, providing deionized water such that it comprises between two and three percent of the solution, and blending the propylene glycol, glycerine, ethylene glycol, dipropylene glycol, butylene glycol, sodium dodecyl sulfate, xanthan gum, ethylenediaminetetraacetic acid, trisodium phosphate, and deionized water into a uniform mixture.

In one implementation, the polyethylene glycol incorporated into the solution is polyethylene glycol in a range of between polyethylene glycol 400 and polyethylene glycol 600. In other implementations, the polyethylene glycol incorporated into the solution may be in the aforementioned greater range of between polyethylene glycol 200 and polyethylene glycol 1000.

Additionally, the method may include the step of mixing the solution with white textile ink. Alternatively, the solution may be mixed with cyan, magenta, yellow, and other colored textile inks without limitation. The solution may also be used with a variety of textile inks, including plastisol inks, reactive inks, dispersion inks, acid inks, and others without limitation. In another implementation, the solution is used with an ink, wherein the solution and the ink are installed in a printhead having a drop size ranging between one and thirty picoliters.

DETAILED DESCRIPTION

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The present invention provides a multi-component suspension solution for ink used in direct-to-garment (DTG) and direct-to-film (DTF) printing but can also work with other printing technologies. Other printing technologies appropriate for the solution include vinyl/eco-solvent printing, UV printing, sublimation printing, and all other liquid ink technologies currently known or hereinafter devised. The suspension is formulated to be completely non-hazardous and non-flammable, making it safe for air transport and regulatory compliance. The solution comprises a propylene glycol in addition to one or more non-flammable solvents, surfactants, dispersants, and/or stabilizers to ensure optimal ink performance while meeting international safety standards.

The solution is designed to be mixed with an existing ink at a ratio of between 5% to 20% (e.g., 50-200 ml of solution per 1000 ml of white ink in one example), with the typical recommended range being between 50 to 100 ml of solution per 1000 ml of ink. The key benefits of the solution include the following:

1) The solution is non-flammable and non-hazardous, thereby ensuring safe handling, storage, and transportation, including compliance with air shipping regulations. 2) The solution prevents printhead clogging by maintaining even suspension of pigments in all ink types, including titanium dioxide in white inks and color pigments in CMYK inks (such as Pigment Blue for Cyan, Pigment Red for Magenta, Pigment Yellow for Yellow, and Pigment Black or Carbon Black for Black), thereby reducing sedimentation and minimizing the need for printhead maintenance. 3) The solution improves ink flow and enhances fluid movement through printheads for consistent printing results. 4) The solution enhances color brightness, thereby producing increased more vibrant prints without significant color distortion. 5) The solution is compatible with DTG & DTF printing and other specialty inkjet printing technologies and works seamlessly with standard digital printing systems. Other printing technologies appropriate for the solution include vinyl/eco-solvent printing, UV printing, sublimation printing, and all other liquid ink technologies currently known or hereinafter devised. 6) The solution is environmentally & logistically friendly since it is compliant with international shipping regulations, thereby making it suitable for global distribution. 7) The solution exhibits antimicrobial activity, helping to prevent microbial growth in stored inks, which contributes to a longer shelf-life and reduces risk of nozzle contamination. 8) The formulation reduces nozzle tip drying by maintaining surface moisture, improving first-drop performance after idle periods.

The solution is a non-flammable, non-hazardous liquid suspension solution for use in white ink printing applications. The solution comprises a single quantity of the following material components in the following relative quantities: 85-90 percent propylene glycol, two percent glycerin, two percent polyethylene glycol (PEG), which may be either PEG-400, being a non-volatile colorless liquid, or PEG-600, which has a paste-like consistency, one percent ethylene glycol, one percent dipropylene glycol, one to two percent butylene glycol, 0.2 percent sodium dodecyl sulfate (SOS), 0.3 percent xanthan gum, 0.1 percent ethylene-diaminetetraacetic acid (EDTA), 0.05 percent trisodium phosphate, and two to three percent deionized water.

In order to use the solution, a prepared quantity of the solution is added to ink in a concentration of five percent to twenty percent by volume. In one example implementation, fifty to two hundred milliliters of solution is added per one thousand milliliters of ink. In a preferred implementation, eighty to one hundred milliliters of solution is added per one thousand milliliters of ink. The resulting mixture provides improve ink stability, preventing the titanium dioxide in the ink (when mixing with white ink, for example) from settling and keeping it evenly dispersed for a longer period of time. The same applies for other pigments and/or ink colors. The lubricating properties of the solution reduce wear and tear inside a printhead. The modified ink produces more vivid colors, while maintaining the originally intended printing properties. And the formulation remains non-flammable and non-hazardous, which meets air transport and shipping safety regulations.

In various alternative implementations, the solution may be used in printheads with drop sizes ranging from 1 to 30+ picoliters. The formulation may include additional non-flammable stabilizers for specific ink formulations. The solution may also be tested for compatibility with various alternative digital printing methods that require enhanced ink performance. Finally, the formula may be adjusted to meet varying climate conditions and storage requirements depending on different markets. The formulation may be customized by varying the ratios of carrier glycols, surfactants, and dispersants to suit different pigment densities, storage climates, or drop size tolerances. The solution has been tested for compatibility with Epson, Ricoh, and other piezoelectric printheads, including those with drop sizes ranging from 1 to 50 picoliters.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A suspension stabilizer solution for pigment-based inks, the solution comprising:
   between 75 and 95 percent by volume of propylene glycol;
   one to five percent glycerine by volume;
   one to five percent polyethylene glycol by volume;
   one to three percent ethylene glycol by volume;
   one to three percent dipropylene glycol by volume;
   between one and two percent butylene glycol by volume;
   0.1 to one percent sodium dodecyl sulfate by volume;
   0.1 to one percent xanthan gum by volume;
   0.1 to one percent ethylenediaminetetraacetic acid by volume;
   0.05 to one percent trisodium phosphate by volume; and
   between one and five percent deionized water by volume.

2. The solution of claim 1, wherein the polyethylene glycol is polyethylene glycol 400.

3. The solution of claim 1, wherein the polyethylene glycol is polyethylene glycol 600.

4. The solution of claim 1, wherein the pigment-based inks include titanium dioxide for white, Pigment Blue for cyan, Pigment Red for magenta, Pigment Yellow for yellow, and Pigment Black or carbon black for black ink.

* * * * *